3,102,041
PROCESS OF PRODUCING CARBON ELECTRODES
Ove Helgessön Sandberg, Oddernes pr., Kristiansand, Norway, assignor to Elektrokemisk A/S, Oslo, Norway, a corporation of Norway
No Drawing. Filed Feb. 5, 1960, Ser. No. 6,837
Claims priority, application Norway Feb. 23, 1959
3 Claims. (Cl. 106—284)

In using carbon electrodes in electric furnaces for the production of aluminum by melt electrolysis and particularly where the electrodes are of the continuous, or so-called Soederberg type, it is known that under unfavorable conditions of operation the electrode will "soot." This means that fine carbon particles gradually fall off the anode and remain floating in the molten bath of cryolite and alumina. In this way the bath becomes contaminated and the soot has to be skimmed off from time to time. This not only results in wasted carbon of the electrode, but valuable fluorine compounds are also removed at the time. It is also recognized that the sooting disturbs the furnace operation and causes an increased consumption of electrode paste which means a considerable economic loss. While it is true that under the ideal operating conditions the disturbing formation of soot may be relatively unimportant, nevertheless it is recognized as being an important overall problem, and the avoidance of sooting should be reduced to a minimum.

The usual paste for use in Soederberg electrodes is made up of crushed and graded coke which may, for example, range in size from about .2 mm. up to about 15 mm., fines, meaning material having a diameter of less than 1 mm., and preferably averaging considerably less than 1 mm., and pitch which is added hot as a liquid. The dry ingredients are made from calcined coke by crushing, sieving and grinding. Roughly speaking, the coarse coke, the fines and the liquid each amount to about ⅓ of the mix and certainly will fall in the range of between 25% and 40% of the mix. The fines ordinarily are combined with the liquid before being added to the coarse ingredients and the fines plus the liquid are considered as the binder. The coke formed by the baking of the binder with the fines embedded in it may be termed the binder coke.

Sooting apparently is due to the selective consumption of the binder coke and the present applicant has discovered that there is a relationship between the sooting phenomena and the microporosity of such coke. By "microporosity" is meant the percentage of pores having a diameter of from about .005 up to 10 microns. As the microporosity increases the tendency of the electrode to soot increases. The percentage of microporosity may be considered as the percentage ratio of the volume of the pores in the binder coke to the total apparent volume of such coke, that is, the actual volume plus the pores. Tests have indicated that in the usual electrode of the Soederberg type, the microporosity of the binder coke is in the range of about 40% to about 60%.

Microporosity may be determined in test electrodes produced from calcined dry substance, ground to the size of 80% through a 200-mesh screen, mixed with a binding agent. The test electrode is then coked at 950° C. for 20 hours under a pressure of 0.5 kg./cm.² which is maintained during the coking process. The density of the electrode is then measured in keorsene and mercury. Experiments have shown that by such measurements virtually only the porosity of the binder coke is determined since the pores of the dry substance coke are either filled with binder coke or covered. The actual microporosity of the binder coke is calculated from the observed density values and the quantity of binder coke in the mixture.

Applicant has found that the microporosity of the binder coke can be very substantially reduced if the ordinary calcined fine coke is substituted, at least in part, by finely ground raw or uncalcined coke. Such coke certainly should contain at least 2% of volatiles and ordinarily will contain from 5% to around 30% of volatile matter. For example, there can be used crude petrol coke, finely ground pitch coke, or the so-called super-coke which is produced from flotation carbon. The latter usually contains between 10% and 20% volatile constituents.

The amount of raw coke fines employed can be varied within wide limits and may for example constitute up to as much as 20% by weight of the entire mix. On the low end beneficial results are obtained if as little as about 2% of the whole mix is in the form of fine raw coke. For ordinary purposes a range of from 5% to 12% of the mix gives good results. This fine raw coke ordinarily will replace from about 5% up to about 75% of the fine calcined coke or may replace it all. A preferred range is to have between 10% and 50% of the calcined fines so replace.. To some extent the raw fines may be added to the mix in addition to the calcined fines. Percentages are by weight.

As used herein, the term calcined coke is defined to mean a coke containing less than 2% volatile matter, and the term raw or uncalcined coke, as previously mentioned, means a coke containing 2% or more of volatile matter.

The raw fines can be added to the mix either by mixing it with the liquid binding agent, before it is mixed with the dry substance, or may be added in the mixer together with the other dry substances and binding agent, or may be ground together with the other dry substances and binding agent, or may be ground together with the part of the calcined coke before addition of binding agent.

This process is illustrated by the following example:

A test paste was prepared using normally calcined petroleum coke (real density 2.04 g./cm.³) and an industrial binder of coal tar pitch with 90° C.R. & B. softening point. Raw petroleum coke was also employed which had 12% volatile matter and 1.2% sulfur.

The calcined coke was fractionated by crushing, sieving and grinding in the ordinary manner after drying. The raw coke was dried in air at a temperature below 200° C. to a negligible moisture content and then ground in a ball mill until 66% passed a 200-mesh screen. The percentage of ingredients was as follows.

| Fraction: | Percent by wt. |
|---|---|
| I (12.5–4.7 mm.) | 20.6 |
| II (4.7–2.5 mm.) | 6.5 |
| III (2.5–0.2 mm.) | 6.5 |
| Calcined fines (66% through 200 mesh) | 25.0 |
| Raw petroleum coke fines (66% through 200 mesh) | 8.7 |
| Pitch (liquid) | 32.7 |
| | 100.0 |

In making the mix the dry material was put in a blade mixer and heated to a temperature of 160° C. Liquid pitch was then added and mixing was carried on for about ½ hour until the ingredients were thoroughly combined.

The physical characteristics of the resulting pitch were then studied and the material was tested in a regular Soederberg electrode. It was found that the green paste properties were about normal. Neither shrinkage nor electrical resistivity were higher than are frequently experienced on usual industrial pastes. It was found however that the microporosity of the binding agent coke in the baked electrodes was cut to approximately one-half and this resulted in the tendency of the electrode to soot being cut to less than half.

It must be borne in mind that a plant with an annular production of 30,000 metric tons of aluminum may have a soot production corresponding to as much as 50 kg. of paste per ton and as such paste has a value of about $70 per ton, this may mean an annular loss of about $50,000. This is in addition to the losses in the form of cryolite necessarily removed from the bath.

From this it follows that a reduction of sooting such as applicant has been able to accomplish is a matter of great commercial importance.

What I claim is:

1. A paste for use in self-baking electrodes consisting essentially of coarse calcined coke, such coarse coke ranging in size from about 0.2 mm. to 15 mm. and having a major proportion by weight of a diameter in excess of 2.5 mm., coal tar pitch as a liquid binder, between 2% and 20% of fine uncalcined coke comprising at least 2% volatile matter and having a major proportion by weight of a diameter of less than 1 mm. and sufficient fine calcined coke having major proportion by weight of a diameter of less than 1 mm. to bring the aggregate of the fine coke up to between 25% and 40% of the whole.

2. A paste as specified in claim 1, in which the coarse coke, the fine coke and the liquid binder each constitutes about one-third of the mix.

3. A paste as specified in claim 1, in which the uncalcined fine coke constitutes between about 5% and 75% of the aggregate fine coke.

References Cited in the file of this patent
UNITED STATES PATENTS 2,653,878    Sejersted et al. _____ Sept. 29, 1953
2,799,053    Gartland _____ July 16, 1957